Figure 1:
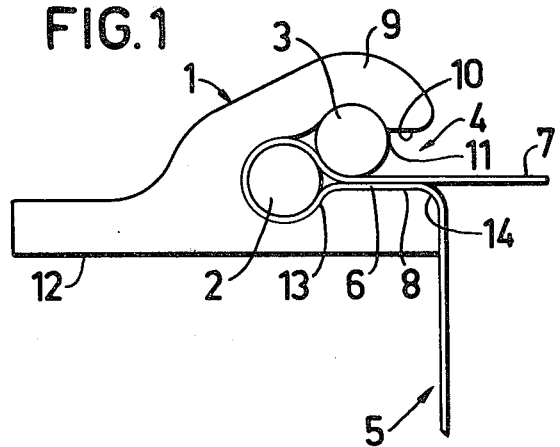

United States Patent [19]

Lindström

[11] 4,337,815
[45] Jul. 6, 1982

[54] DEVICE FOR ATTACHING A CLOTH

[75] Inventor: Rune Lindström, Kåge, Sweden

[73] Assignee: Skega AB, Ersmark, Sweden

[21] Appl. No.: 175,844

[22] Filed: Aug. 6, 1980

Related U.S. Application Data

[63] Continuation of Ser. No. 850,834, Nov. 11, 1977, abandoned.

[30] Foreign Application Priority Data

Nov. 15, 1976 [SE] Sweden .................................. 7612730

[51] Int. Cl.³ .......................................... A47H 13/00
[52] U.S. Cl. .................................... 160/392; 160/395; 160/327
[58] Field of Search ............... 160/392, 393, 394, 395, 160/396, 397, 400, 327, 328

[56] References Cited

U.S. PATENT DOCUMENTS

| | | | |
|---|---|---|---|
| 3,090,646 | 5/1963 | Johnson | 160/392 |
| 3,421,276 | 1/1969 | Bache | 160/395 X |
| 3,811,454 | 5/1974 | Huddle | 160/395 X |
| 3,987,835 | 10/1976 | Bloomfield | 160/395 X |

FOREIGN PATENT DOCUMENTS

| | | |
|---|---|---|
| 626844 | 3/1936 | Fed. Rep. of Germany ...... 160/395 |
| 1235474 | 6/1971 | United Kingdom . |
| 1323920 | 7/1973 | United Kingdom . |

Primary Examiner—Philip C. Kannan
Attorney, Agent, or Firm—Cushman, Darby & Cushman

[57] ABSTRACT

A device for releasably holding flexible sheet material, comprising a holding member having a longitudinal slot with an entrance opening to the slot extending along the length of the slot, a first elongate locking member inserted through the entrance opening into the slot, and a second elongate locking member inserted through the entrance opening, after the first locking member, into the slot, the second locking member having a thickness greater than the entrance opening and being inserted through the opening by force, the device being such that the flexible sheet material extends around the first locking member and has two layers of material unsecured to each other and extending past the second locking member and out through the entrance opening adjacent a first wall of the slot, and the second locking member, when in its effective locking position in the slot, is in contact with the first locking member through one of the layers and situated between the two layers of the flexible material on one side and a second wall of the slot on the other side of the second locking member, which second wall is defined by a surface of a slightly resilient overhang integrally formed with the holding member, whereby tension applied to the layer nearest the first wall tends to lock the sheet more firmly in the slot and tension applied to the other of the layers tends to release the material from the slot.

6 Claims, 2 Drawing Figures

DEVICE FOR ATTACHING A CLOTH

This is a continuation of application Ser. No. 850,834 filed Nov. 11, 1977, now abandoned.

This invention relates to a device for attaching a cloth of rubber, plastic, textile or other flexible material.

Clothes of elastic or plastic material often are used as dust-protection in crushing plants and other dusting installations and machines to prevent the dust from spreading into the working room and deteriorating the working environment. These dustprotective clothes heretofore usually have been attached by means of screw or bolt joints. Their screws or bolts, however, had to be positioned very densely for obtaining a satisfactory sealing. The work involved with mounting and dismounting the cloth, consequently, was tedious.

Another known device for attaching a cloth comprises a rod of metal or rigid plastic with circular cross-section, about which rod the cloth is to be placed, and an elastically deforming clamping strip provided with an undercut longitudinal groove for clamping the cloth on the rod. This device per se is easy to mount and dismount, but shows the disadvantage that at greater loads acting on the cloth the strip is heeled from the rod.

The object of the present invention, therefore, is to produce a device for attaching a cloth which is easy to mount and dismount and capable to withstand relatively great loads on the cloth without causing its detaching.

This object is achieved thereby that the present invention has been given the characterizing features defined in the attached claims.

Figure 2:
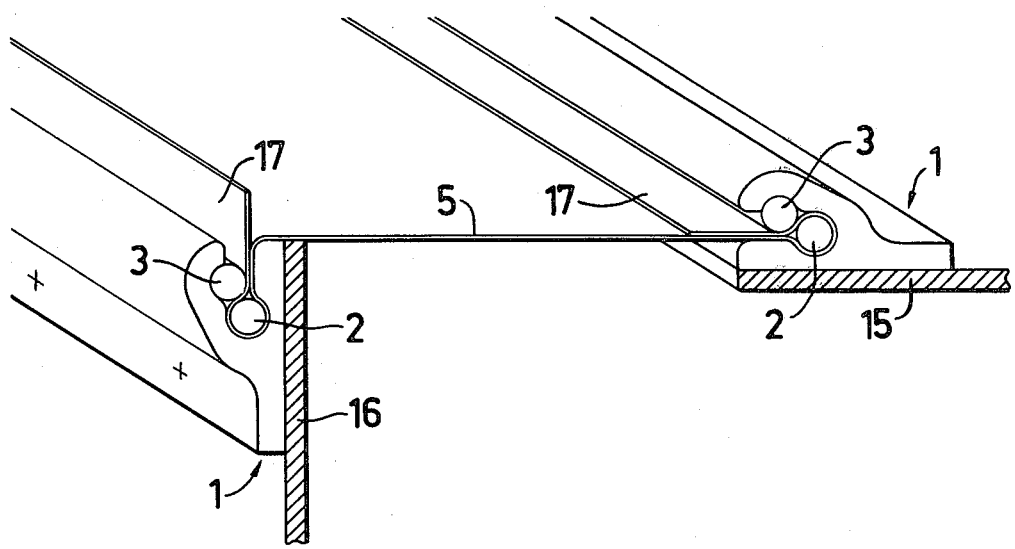

The invention is described in greater detail in the following, with reference to the accompanying drawing, in which FIG. 1 is an end view of the device according to the invention with an attached cloth, and FIG. 2 is a perspective view of a cloth attached between two members by a device according to the invention.

The device according to the invention comprises a holding member 1 of a polymer or metallic material and two locking members 2 and 3, one of which is intended be enclosed by the cloth 5 to be attached. Said locking members may but need not have identical cross-sectional shape and dimension. In the drawing, however, the locking members 2 and 3 are designed identically and consist of circular strips or strings of rubber or some other not too much compressible material.

In said holding member 1 a longitudinal slot 4 is formed, into which the two locking members 2 and 3 are to be inserted one after the other. The locking member being inserted first into the slot is to be enclosed by the cloth 5 in such a manner, that the cloth with two abutting strands 6, 7 projects out of the slot 4. The second locking member, i.e. the member 3, in its position inserted into the slot 4 presses the abutting strands 6, 7 of the cloth against one defining surface 8 of the slot and is retained in this position by a slightly resilient overhang 9 integral with the holding member 1. Said overhang has an end surface 10 facing towards said defining surface 8 of the slot and located at a distance therefrom which is smaller than the diameter of the locking member and at least smaller than the locking member 3 located outermost in the slot, so that in any case this member cannot be inserted through the slot opening or entrance defined by the surfaces 8, 10 unless said member is pressed through said opening. This should but need not apply also to the other locking member even when it is not enclosed by a cloth. The depth of the slot from the inner edge 11 of the end surface substantially should correspond to the total of the diameters of the locking members, so that the locking members 2, 3 press the cloth against the slot walls. The slot 4, furthermore, as shown in the Figure can be designed so that the inner locking member 2 is located closer to the lower surface 12 of the holding member than the outer locking member 3, thereby giving rise to the formation of a slope or elevation 13 in front of the inner locking member 2.

In attached state, as shown in FIG. 1 and also in FIG. 2, the cloth 5 encloses the locking member 2 pressed farthest into the slot 4 and extends with its two abutting strands 6 and 7 between the surface 8, which may be rounded at its forward edge 14, and the outer locking member 3, which supported by the cover or overhang 9 presses the strands 6 and 7 against each other and against the surface 8, thereby locking the cloth in a safe manner in cooperation with the second locking member and the slot surfaces. When the lower strand 6 is exposed to tensional forces, the cloth 5 tends to turn the locking member 2 in counter-clockwise direction and the locking member 3 in clockwise direction in FIG. 1. The two locking members 2 and 3 thereby additionally clamp the cloth so that not even a sliding movement can arise between the cloth, locking members and slot surfaces. When the upper strand 7 is pulled in, however, the outer locking member 3 is turned out of the slot 4 and drawn out through the opening of the slot. The cloth 5 then is released. The upper strand 7, with other words, is used for dismounting the cloth 5, which, thus, can be carried out in a very simple and rapid manner.

In FIG. 2 a cloth 5 is shown clamped between two metal sheets 15 and 16 by means of two devices according to the invention. At each such sheet a holding member 1 with its lower surface 12 abutting the sheet in question is attached by screws or by welding, if both the locking member and the sheet consist of weldable material. At these holding members the cloth 5 is attached with its edge portions and locked by means of locking members 2 and 3. Irrespective of whether the cloth 5 is exposed to a load from above or from below, tensional forces arise in the cloth which increase the locking effect caused by the locking members 2 and 3 at both edge portions of the cloth. The dismounting of the cloth, on the other hand, requires only pulling of the cloth at its two upper strands 17.

The device according to the invention is not restricted to the embodiments described above, but can be applied to the attaching of screenings consisting of cloth and to curtain mountings a.s.o. Also other materials than those mentioned above can be used for the different details. The material being used, however, must be of such a nature that friction arises between the cloth and the locking members as well as between the cloth and the slot surfaces.

The present invention is not restricted to what is described above and shown in the drawings, but can be altered and modified in many different ways within the scope of the invention idea as defined in the attached claims. The locking members, for example, must not be circular, but may have another polygonal cross-sectional shape, and special seats corresponding to the respective locking members may be provided in the slot, as slightly indicated in the Figures.

What I claim is:

1. A device for releasably holding flexible sheet material, comprising a holding member having a longitudinal slot with an entrance opening to said slot extending along the length of said slot, a first elongate locking member inserted through said entrance opening into said slot, and a second elongate locking member inserted through said entrance opening, after said first locking member, into said slot, said second locking member having a thickness greater than the entrance opening and being inserted through said opening by force, the device being such that the flexible sheet material extends around said first locking member and has two layers of material unsecured to each other and extending past the second locking member and out through said entrance opening adjacent a first wall of the slot, and said second locking member, when in its effective locking position in said slot, is in contact with said first locking member through one of said layers and situated between said two layers of the flexible material on one side and a second wall of the slot on the other side of said second locking member, which second wall is defined by a surface of a slightly resilient overhang integrally formed with the holding member, whereby tension applied to the layer nearest said first wall tends to lock the sheet more firmly in the slot and tension applied to the other of said layers tends to release the material from the slot.

2. A device according to claim 1 wherein the locking members have a thickness corresponding to the width and depth of the slot counted from the entrance opening, so that the members inserted into the slot press the flexible sheet material against the walls of the slot.

3. A device according to claim 1, wherein the locking members have mutually equal cross-sectional shape and dimension.

4. A device according to claim 1, wherein each of the locking members comprises a strip of rubber with circular cross-sectional shape.

5. A device according to claim 1, wherein there is an elevation in said first wall of said slot at a location between said first and second locking members.

6. A device for releasably attaching a flexible sheet comprising: a holding member having a generally planar mounting surface and a slot projecting from an entrance opening toward said mounting surface, said entrance opening being defined by opposed, first and second spaced-apart entrance surfaces which are generally parallel to said mounting surface, and the walls of said slot in cross-section defining a first concave surface which extends from said first entrance surface toward said mounting surface, the walls of said slot further defining a second concave surface which merges with said first concave surface and with said second entrance surface; first and second locking members of generally circular cross-section insertable in said slot so that said first locking member can reside adjacent said first concave surface and so that said second locking member can reside adjacent said second concave surface, the depth of said slot being substantially equal to the combined diameters of said locking members, at least said second locking member having a diameter greater than the distance between said entrance surfaces so that it is insertable in said slot by force after insertion of said first locking member, the latter in its inserted position being enclosed by the flexible sheet, the sheet material being folded over said first locking member so that two layers of the sheet reside adjacent said first entrance surface and extend out through said entrance opening, said two layers being unsecured to each other, said second locking member when in its locking position being in contact with said first locking member through one of the layers and having both layers located between itself and said first entrance surface whereby tension applied to the layer in contact with said second locking member releases the sheet material from the slot and whereby tension applied to the other layer tends to lock the sheet material in the slot.

* * * * *